United States Patent
Pan et al.

(10) Patent No.: US 10,432,009 B2
(45) Date of Patent: Oct. 1, 2019

(54) OPEN LOOP TUNING METHOD FOR EFFICIENCY OPTIMIZATION IN ELECTRIC TOOTHBRUSH WIRELESS CHARGING SYSTEM

(71) Applicant: Shenzhen Yichong Wireless Power Technology Co. Ltd., Shenzhen (CN)

(72) Inventors: Siming Pan, San Jose, CA (US); Tun Li, San Jose, CA (US); Dawei He, Burlingame, CA (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 194 days.

(21) Appl. No.: 15/372,013

(22) Filed: Dec. 7, 2016

(65) Prior Publication Data

US 2018/0159353 A1    Jun. 7, 2018

(51) Int. Cl.
*H02J 7/02*        (2016.01)
*H02J 50/12*       (2016.01)
*H02J 7/04*        (2006.01)
*H02J 50/60*       (2016.01)
*H02J 7/00*        (2006.01)

(52) U.S. Cl.
CPC .............. *H02J 7/025* (2013.01); *H02J 7/045* (2013.01); *H02J 50/12* (2016.02); *H02J 2007/0062* (2013.01); *Y02B 40/90* (2013.01)

(58) Field of Classification Search
CPC ...... H02J 7/007; H02J 7/14; H02J 2007/0001; H02J 2007/0098; H02J 2007/0096; H02J 7/025; Y02E 60/12; Y02T 90/122; B60L 11/182; H01F 38/14
USPC .......................................................... 320/108
See application file for complete search history.

(56) References Cited

U.S. PATENT DOCUMENTS

| | | | | |
|---|---|---|---|---|
| 2012/0104867 A1* | 5/2012 | Mudrick | ................. | H02J 7/025 307/104 |
| 2012/0306286 A1* | 12/2012 | Kim | ........................ | H02J 7/007 307/104 |
| 2015/0054451 A1* | 2/2015 | Rokusek | ................. | H02M 7/23 320/108 |

(Continued)

*Primary Examiner* — Richard Isla
*Assistant Examiner* — Mohammed J Sharief
(74) *Attorney, Agent, or Firm* — Sheppard Mullin Richter & Hampton LLP (57) ABSTRACT

An apparatus for charging one or more electric devices. The device may comprise a resonant circuit configured to wirelessly couple to the one or more electric devices, a boost converter configured to convert a system voltage received by the apparatus to an input voltage of a power amplifier that drives the resonant circuit, a sensing circuit configured to detect the input voltage and an associated input current, and a controller. The controller may be configured to receive the detected input voltage and the detected input current, compare the received input voltage and the received input current with stored voltage and current information, identify a difference between the received input voltage and a predetermined voltage according to the stored voltage and current information, and control the boost converter to adjust the input voltage by the identified difference to the predetermined voltage. The adjustment may not need any feedback or communication from the power receiver unit.

20 Claims, 7 Drawing Sheets

(56) References Cited

U.S. PATENT DOCUMENTS

2016/0006272 A1\* 1/2016 Greening .............. H02J 7/0008
                                                320/162
2017/0104359 A1\* 4/2017 Jung ................. H02J 7/025
2017/0229921 A1\* 8/2017 Hwang ................ H03F 3/3015

\* cited by examiner

OPEN LOOP TUNING METHOD FOR EFFICIENCY OPTIMIZATION IN ELECTRIC TOOTHBRUSH WIRELESS CHARGING SYSTEM

TECHNICAL FIELD

The present disclosure relates generally to methods and systems for wirelessly charging devices, and more particularly, to methods and systems for wirelessly charging an electric tooth-brush with an optimized charging efficiency.

BACKGROUND

Wireless charging is an evolving technology that may bring great convenience to charging millions of electronic devices. Wireless charging for electric toothbrushes is one of the most typical applications. Due to the water resistance and electrical safety requirements, the batteries of modern electric toothbrushes are usually hermetically sealed inside of their handles. Therefore, wireless charging becomes the most suitable and convenient way to recharge the sealed batteries.

In an electric toothbrush wireless charging system, energy is transferred from a power transmitter to one or multiple power receivers, via a pair of coupled magnetic coils, one disposed in the transmitter and the other in the receiver. The charging efficiency, which is the ratio of the received power by the receiver over the transmitted power from the transmitter, is the most critical parameter in wireless charging. Improving the charging efficiency will effectively reduce the energy wasted during transmission, and prevent heat discharges or over-voltage damages to the charging devices. Also, the improved efficiency could eliminate unnecessary electromagnetic radiations, preventing potential radiation effects to human bodies.

Most of the electric toothbrush products, such as Philips Sonicare Diamond Clean or Oral-B P7000, are equipped with the wireless charging features. However, these conventional systems cannot tune the transmitter power during a charging process, e.g., in situations when the battery becomes fully charged or when the brush is moved, so the charging efficiency is not optimized.

SUMMARY

One aspect of the present disclosure is directed to an apparatus for charging one or more electric devices. The device may comprise a resonant circuit configured to wirelessly couple to the one or more electric devices, a boost converter configured to convert a system voltage received by the apparatus to an input voltage of a power amplifier that drives the resonant circuit, a sensing circuit configured to detect the input voltage and an associated input current, and a controller. The controller may be configured to receive the detected input voltage and the detected input current, compare the received input voltage and the received input current with stored voltage and current information, identify a difference between the received input voltage and a predetermined voltage according to the stored voltage and current information, and control the boost converter and/or a gate driver to adjust the input voltage by the identified difference to the predetermined voltage. The adjustment may not need any feedback or communication from the power receiver unit.

Another aspect of the present disclosure is directed to a method for charging one or more electric devices. The method may comprise converting a system voltage received by the apparatus to an input voltage of a power amplifier that drives a resonant circuit of the apparatus, the resonant circuit wirelessly coupled to the one or more electric devices, detecting the input voltage and an associated input current, comparing the detected input voltage and the detected input current with stored voltage and current information, identifying a difference between the detected input voltage and a predetermined voltage according to the stored voltage and current information, and controlling the boost converter and/or a gate driver to adjust the input voltage by the identified difference to the predetermined voltage. The adjustment may not need any feedback or communication from the power receiver unit.

Another aspect of the present disclosure is directed to a system for charging one or more electric devices. The system may comprise a processor. The processor may be configured to compare an input voltage and an input current with stored voltage and current information, identify a difference between the input voltage and an predetermined voltage according to the stored voltage and current information, and control at least one of a boost converter or a gate driver to adjust the input voltage to the predetermined voltage. The adjustment may not need any feedback or communication from the power receiver unit.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Open loop tuning methods and systems for optimizing the charging efficiency in electric toothbrush are disclosed. In some embodiments, the tuning method may be based on real-time monitoring of system parameters, so the system can adaptively optimize charging efficiency for different receiver locations and different charging stages of the toothbrush receiver. In addition, this method may not require feedback information from the toothbrush receiver to the transmitter, and thus can reduce the manufacturing cost. A more detailed comparison between existing charging methods and the open-loop charging methods disclosed herein for charging electric toothbrush is shown in Table 1. The disclosed systems and methods may mitigate or overcome one or more of the problems set forth above and/or other problems in the prior art.

TABLE 1

|  | Existing Charging Methods | Open-Loop Charging Method |
| --- | --- | --- |
| Charging efficiency optimization | Not supported | Supported |
| Real-time system parameter monitor | Not supported | Supported |
| Adaptive tuning based on different charging stages | Not supported | Supported |
| Charging Area | Small | Large |
| Placement Angle of Toothbrush | Fixed angle | Can tilt from 0 to 30 degrees |

Figure 1:
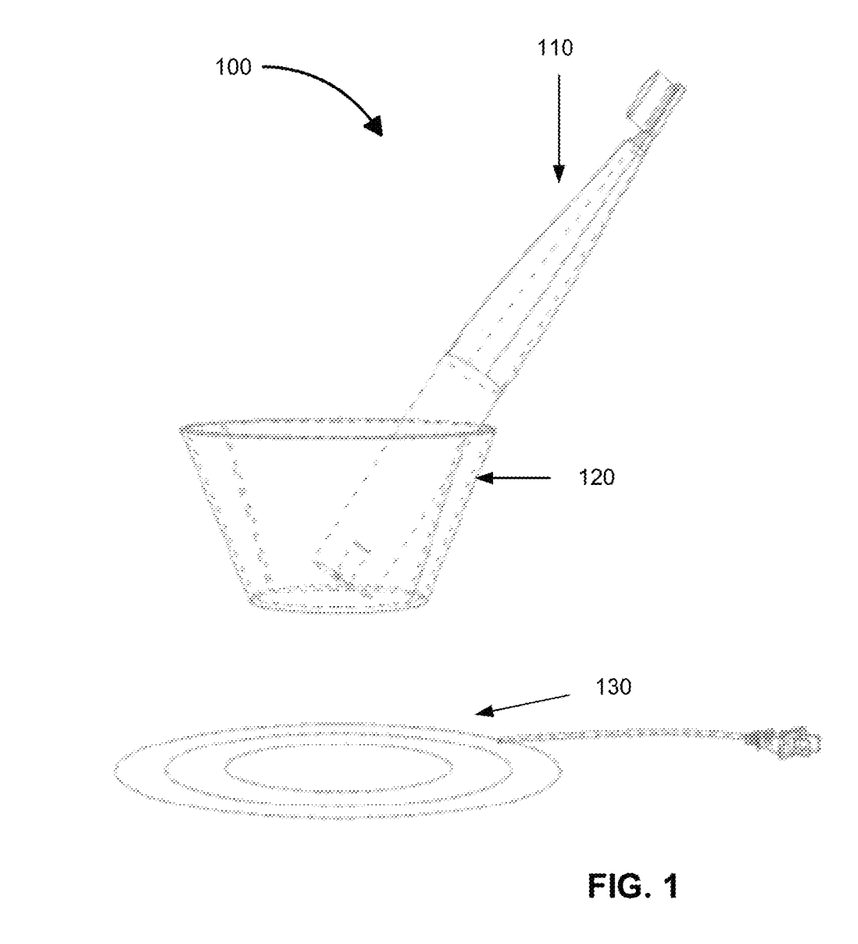
FIG. 1 is a graphical representation illustrating a wireless charging system, consistent with exemplary embodiments of the present disclosure.

FIG. 1 is a graphical representation 100 illustrating an electric device 110 that may be placed in a free position in a cup holder 120 that would be placed on a charging plate 130, consistent with exemplary embodiments of the present disclosure. The electric device 110 in this example may be an electric toothbrush. A person of ordinary skill in the art would understand that the electric device 110 may have a shape, size and/or angular body different from that of the electric toothbrush shown in FIG. 1. Electric device 110 may also embody other types of electrical devices that include one or more chargeable or replaceable batteries. Electric device 110 may be a Bluetooth device, a near field communication device or radio frequency identification device or any internet of things device.

The cup holder 120 may hold more than one electric device 110. The cup holder 120 may be made of glass or plastic materials. In certain embodiments, the cup holder may be of any shape that would allow holding different electrical devices. The cup holder 120 may be a cup that is routinely available in a household and need not be specifically designed to work with the wireless charging station shown in the graphical representation 100. For example, the inner surface of the cup does not need to have a special design to hold the toothbrush in fixed positions inside the cup. In FIG. 1, the wireless charging station 130 is shown to be separate and distinct from the cup holder. In certain embodiments, the wireless charging station 130 may be a round uniform plate connected permanently with the base of the cup holder 120. In certain embodiments, the wireless charging station 130 may be disposed on the cup holder 120, and can be moved or removed freely.

As illustrated in FIG. 1, electric device 110 is in a free position. Electric device 110 each time may be placed in a different position in the cup holder. There is no special mechanical coupling between the bottom of the electric device and the base of the cup holder. In certain embodiments, the electric device 110 is at an angle from the base of the cup holder 120. In certain embodiments, the electric device 110 is resting at an angle between 0 and 30 degrees to the base of the cup holder. The position of the electric device 110 in FIG. 1 is merely illustrative. In certain embodiments, the distance between the bottom of the electric device 110 and the wireless charging station 130 can vary from 1 cm to 10 cm.

In certain embodiments, the wireless charging station 130 may include a sensor that detects whether there are one or more electric devices 110 placed in a cup holder 120 for charging. Based on whether an electric device 110 is sensed, the wireless charging station 130 may enable or disable the charging circuit allowing for efficient power consumption.

Figure 2:
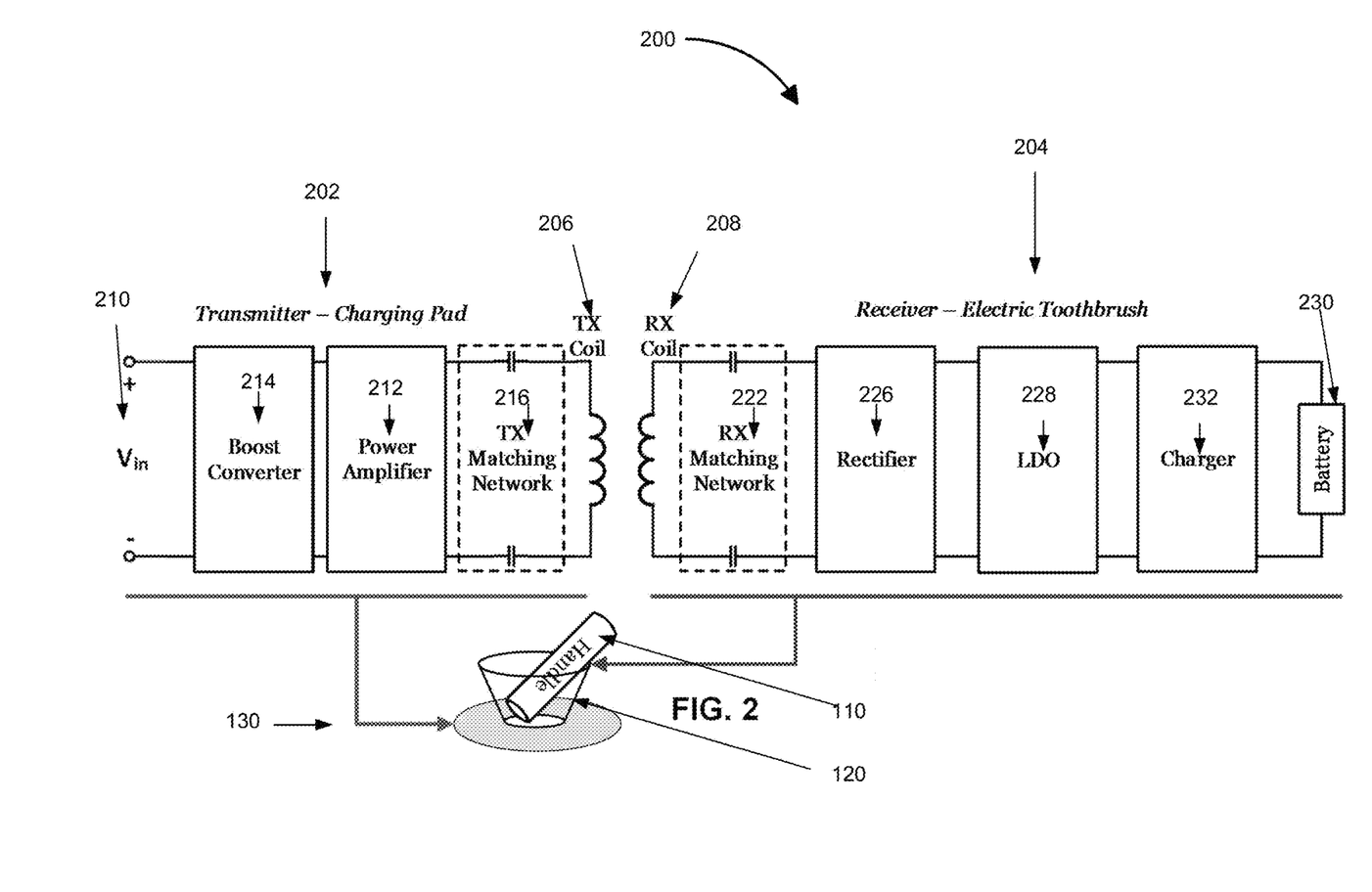
FIG. 2 is a diagram of a wireless charging system showing transmitter and receiver, consistent with exemplary embodiments of the present disclosure.

FIG. 2 shows a wireless charging system 200, consistent with exemplary embodiments of the present disclosure. As shown in FIG. 2, the wireless charging system 200 includes a transmitter side 202 and a receiver side 204. The transmitter side 202 and receiver side 204 are coupled by inductors 206, 208 therebetween. In one exemplary embodiment, the transmitter side 202 includes voltage input nodes (+ and −) 210, a boost converter 214, a power amplifier 212 and a transmitter matching network 216. The receiver side 204 includes a receiver matching network 222, a rectifier 226, a low dropout regulator (LDO) 228, a charger 232 and a battery 230. The transmitter side 202 may be implemented in a charging device or a charging station. The receiver side 204 may be implemented in a consumer electronic device, such as a cell phone, headset, watch, tablet device, laptop, electronic brush, electric toothbrush, car, or any other consumer electronic devices that may be wirelessly charged. Alternatively, the receiver side may be implemented as a stand-alone charging device for a user to attach a consumer electronic device. For example, a user can attach the chargeable battery portion of an electronic device as the battery 230 as shown in FIG. 2.

As shown in FIG. 2, the input nodes receive an input voltage Vin 210. In certain embodiments, the input voltage Vin 210 may be 5 volts provided through a USB port. The input nodes are connected to a boost converter 214. The boost converter 214 can provide a range of the DC voltage that can be fed into the power amplifier. For example, the boost converter 214 may be a step up converter that converts the Vin 210 from 5 volts to 12 volts. The output of the boost converter 214 feeds the power amplifier 212, which amplifies the input voltage Vin. The power amplifier 212 is connected to the TX matching network 216. The TX matching network 216 is connected to the inductor 206. The TX matching network 216 may include one or more capacitors. Capacitance of one or more of the capacitors may be adjustable. The TX matching network 216 and the inductor 206 form a resonant circuit or an LC circuit where the L represents the inductor and C represents the capacitor connected together. The frequency of the LC circuit can be adjusted by adjusting the capacitance of the TX matching network 216. The inductor 206 transmits the energy to the inductor 208 on the receiver side 204.

On the receiver side 204, similar to the transmitter side 202, the inductor 208 is connected to the RX matching network 222, which has one or more capacitors. One or more of the capacitors may have adjustable capacitance. The capacitors are used to adjust the frequency of an LC circuit formed by the inductor 208 and RX matching network 222. Accordingly, the resonant frequency of the LC circuit can be determined by tuning the capacitance and inductance and/or by accurately choosing the capacitor and the inductor. In certain embodiments, the transmitter 202 and the receiver 204 may be specially configured to have a resonant frequency above 1 MHz, e.g., at 6.78 MHz. Since the TX coil 206 and the RX coil 208 are magnetically coupled, oscillations in the transmitter 202 may induce electromotive forces in the receiver 204.

The RX matching network 222, is connected to the rectifier 226, which is connected to a low drop out regulator 228. The energy is received by the inductor 208 and transmitted to the rectifier 226, which converts the alternating current (AC) to direct current (DC). The low dropout regulator 228 regulates the voltage from the rectifier 226, forwards it to the charger 232 and outputs it to the battery 230. In certain embodiments, a buck converter may be used instead of the low drop out regulator.

Figure 3:
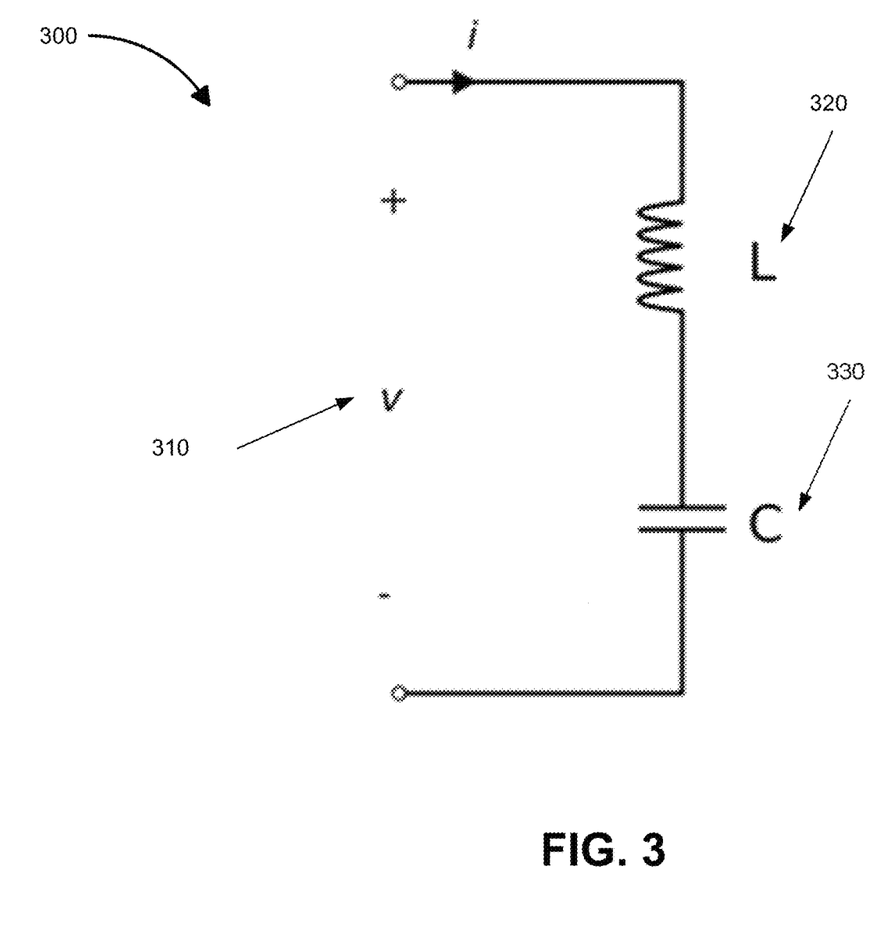
FIG. 3 is a diagram of basic components of a resonant circuit or an LC circuit, consistent with exemplary embodiments of the present disclosure.

FIG. 3 shows basic components of a resonant circuit or an LC circuit, consistent with exemplary embodiments of the present disclosure. Voltage input from the transformer is shown as v 310. L is the inductor 320 that is connected in series to a capacitor C 330. An LC circuit is also known as a tuned circuit. Its resonant frequency can be tuned by tuning the capacitance of C and the inductance of L. An LC circuit acts as an electrical resonator storing energy oscillating at the circuit's resonant frequency.

Figure 4A:
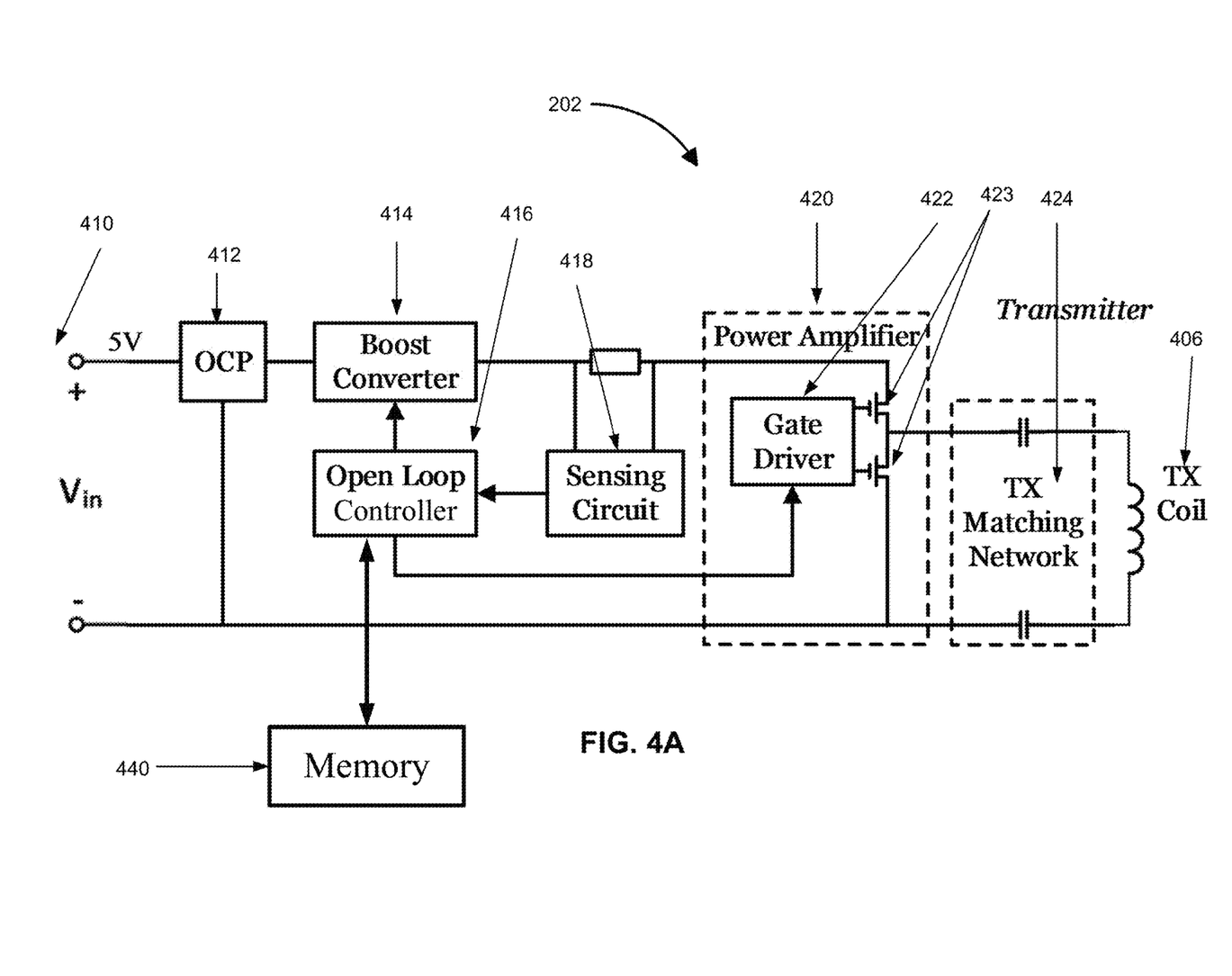
FIG. 4A is a diagram of a wireless charging transmitter, consistent with exemplary embodiments of the present disclosure.

FIG. 4A shows the transmitter side 202 of the wireless charging system 200, consistent with exemplary embodiments of the present disclosure. As shown in FIG. 4A, the transmitter side 202 is coupled by inductor TX Coil 406. In one exemplary embodiment, the transmitter side 202 includes system voltage input nodes (+ and −) 410, an over current protection circuit (OCP) 412, a boost converter 414, a controller (e.g., an open loop controller 416), a sensing circuit 418, a power amplifier 420 with a gate driver 422 and a transmitter matching network 424. Some of the components, such as the OCP 412, may be optional.

As shown in FIG. 4A, the input nodes receive a system input voltage Vin 410. In certain embodiments, the input voltage Vin is 5 volts. The input voltage Vin is connected to an over current protection circuit 412, followed by a boost converter 414. The boost converter 414 can provide a range of the DC voltage that can be fed into the power amplifier. For example, the boost converter 214 may be a step up converter that converts the Vin 210 from 5 volts to 12 volts. The output of the boost converter 414 feeds the power amplifier 420, which amplifies the input voltage Vin. The power amplifier 420 is connected to the TX matching network 424.

Figure 4B:
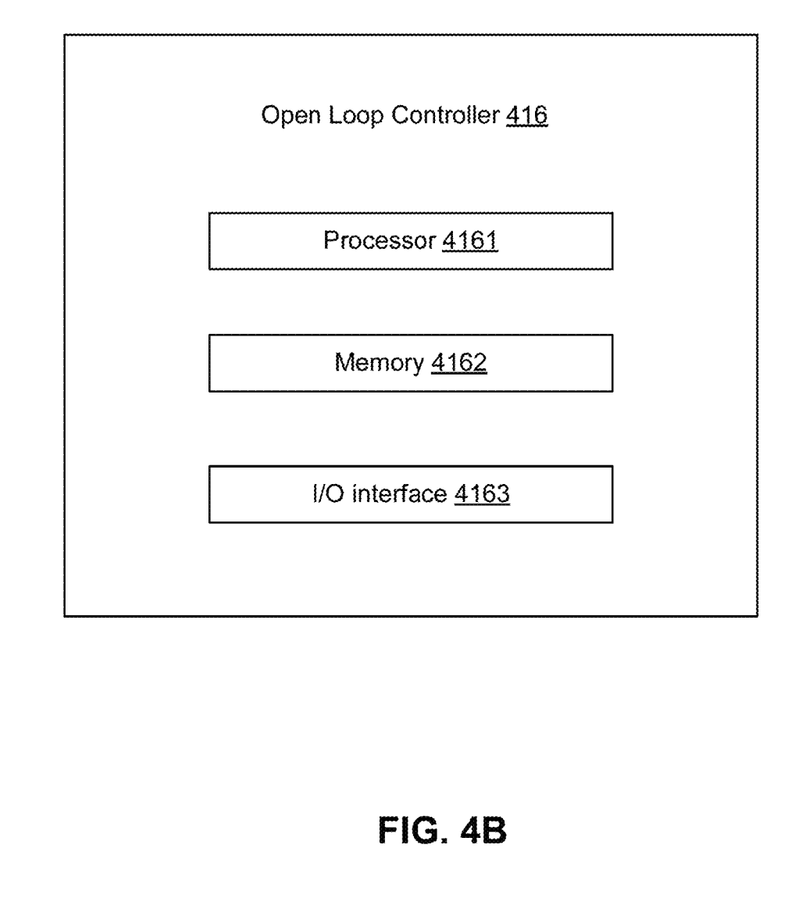
FIG. 4B is a block diagram illustrating an open loop controller, consistent with exemplary embodiments of the present disclosure.

The open loop controller 416 is connected to the gate driver 422 and the boost converter 414. The open loop controller 416 may control the output voltage of the boost converter 414 and/or the switching operation of the gate driver 422. In some embodiments, the open loop controller 416 may be a micro controller unit (MCU). Referring to FIG. 4B, FIG. 4B is a block diagram illustrating an open loop controller 416, consistent with exemplary embodiments of the present disclosure. The open loop controller 416 may include a processor 4161, a memory 4162, and an I/O interface 4163, some of which may be optional. The I/O interface 4163 may receive signals and/or instructions, such as sensing signals from the sensing circuit 418. The I/O interface 4163 may also transmit signals and/or instructions which control other components of the transmitter side 202, such as the boost converter 414. The memory 4162 may be a non-transitory computer-readable storage media storing instructions that, when executed by the processor 4161, cause the open loop controller 416 to perform method 400 described below with reference to FIG. 4C. In some embodiments, the open loop controller 416 may store a lookup table described below with reference to Table 2 in the memory 4162. In some embodiments, the power transmitter 202 may comprise a memory 440 outside the open loop controller 416. Similar to the memory 4162, the memory 440 may store information such as the Table 2, and/or instructions that cause system 200 to perform the methods disclosed herein. In some alternative embodiments, the memory 440 may be disposed on a computer, a server, or a device outside system 200, and the open loop controller 416 may communicate with the memory 440 through wired or wireless connections to utilize stored information, such as the Table 2 and the instructions.

Referring back to FIG. 4A, the power amplifier 420 may include the gate driver 422 and one or more MOFSET gates 423. The gate driver 422 acts as a switch to turn on or off the MOFSET gates 423. In some embodiments, the MOFSET gates 423, and thus the power amplifier 420, may be periodically turned on and off to check for any power receiver device. To conserve power, the power amplifier 420 may repeatedly turn on for a very short period, e.g., a few seconds, when unloaded. When one or more electric devices are detected, the power amplifier 420 may stay turned on through the gate driver 422. In some other embodiments, the presence of a power receiver device can be detected by the sensing circuit 418. When there is no electric device on the receiver side, the power amplifier 420 is turned off using the gate driver 422. The open loop controller 416 may control the gate driver 422 to perform the turning on/off.

The sensing circuit 418 gives feedback to the gate driver 422 through the open loop controller 416. The sensing circuit 418 detects whether there are one or more electric devices 110 placed in the cup holder 120 for charging. The sensing circuit 418 may also detect real time voltages and currents output from the boot converter 414 and transmit such information to the open loop controller 416. Based on the received information, such as the presence of electric devices and/or the real time voltages and currents, the open loop controller 416 may send signals and/or instructions to control the boost converter 414 and/or the gate driver 422.

The sensing circuit 418 working together with the open loop controller 416 optimizes charging efficiency based on real-time monitoring of system parameters from the sensing circuit 418. For example, if no electric device is detected, the open loop controller may control the boost converter 414 and/or the gate driver 422 to lower the unloaded power consumption, such that the power consumption when there are no electric devices charging may be as low as or under 0.5 watts.

The TX matching network 424 is connected to the inductor 406. Inductor 406 may also be referred to as a TX coil or an inductor coil. The TX matching network 424 may include one or more capacitors. Capacitance of one or more of the capacitors may be adjustable. The TX matching network 424 and the inductor 406 form a transmitter resonant circuit or an LC circuit where the L represents the inductor and C represents the capacitor connected together. The frequency of the LC circuit can be adjusted by adjusting the capacitance of the TX matching network 424. The inductor 406 transmits the energy to an inductor on the receiver side. The inductor 406 (TX coil) may then wirelessly transfer power to a receiver coil by inductive coupling.

Figure 4C:
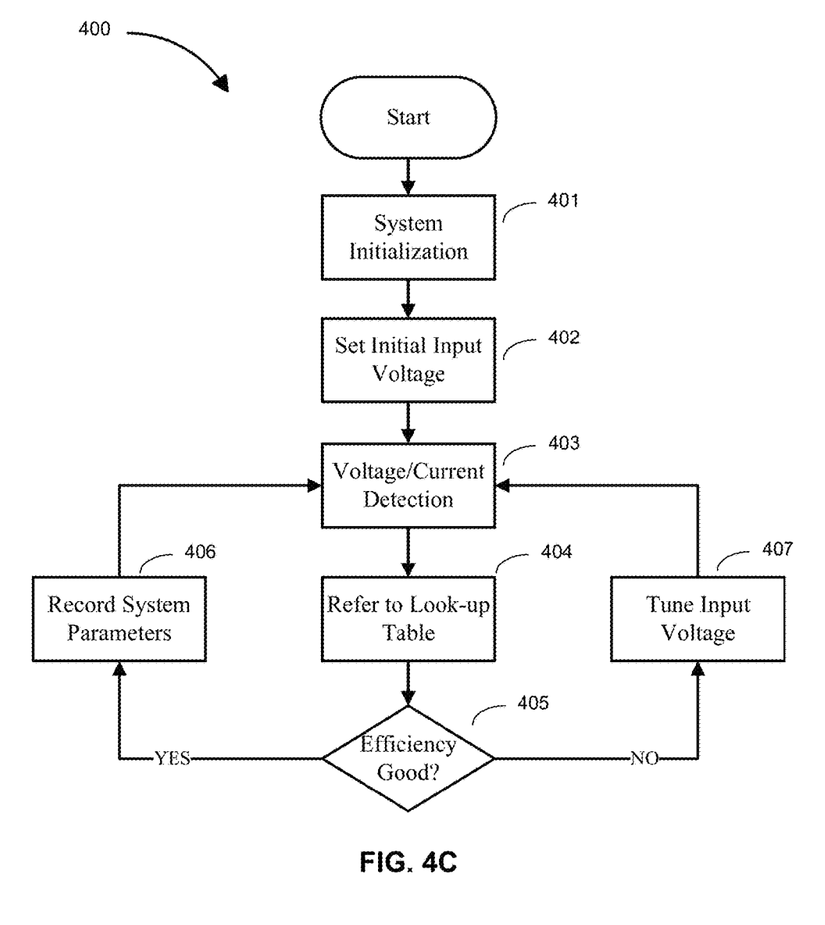
FIG. 4C is a flowchart illustrating a method for charging electric devices, consistent with exemplary embodiments of the present disclosure.

FIG. 4C is a flowchart illustrating a method 400 for wireless charging, consistent with exemplary embodiments of the present disclosure. Method 400 may be performed by one or more components of the system 200, e.g., the open loop controller 416. The method 400 may include a number of steps, some of which may be optional, e.g., step 401.

At step 401, the system 200 initializes. For example, the power transmitter 202 is plugged into a power source and receives the system input voltage 410.

At step 402, after the system starts, the power transmitter 202 may supply an input voltage to the power amplifier 420. The input voltage may be the system input voltage 410 or may be that boosted by the boost converter 414.

At step 403, the sensing circuit 418 may detect a current input voltage and current. Since the current voltage and current may change with toothbrush positions and/or battery charging stages, the detection may be performed continuously in real time. The sensing circuit 418 may also calculate the impedance based on the current input voltage and current. The sensing circuit 418 may also transmit the detected current voltage and/or current to another component, e.g., the open loop controller 416.

At step 404, the TX system, e.g., the processor 4161 of the open loop controller 416, may compare the detected current voltage and current with voltage and current information in a local lookup table described below with reference to Table 2. Table 2 shows an exemplary lookup table of a 2 W output power transfer unit for electric toothbrushes. Numbers in this table may be predetermined to optimize the power transfer efficiency of the system. The input voltage range is 5~8 V as indicated by the top bold row, and the input current range is 0.1~1 A as indicated by the left bold column. The input voltage tuning step is 100 mV, as indicated by the increments of 100 mV across the bold input voltage row. Other numbers in the table represent $\Delta V$, each corresponding to an input voltage and an input current. The $\Delta V$ values may each indicate a difference between the current voltage, which correspond to an input voltage in the table, to the ideal voltage. The ideal voltage may be a predetermined voltage that maximizes the power transfer efficiency of the system at the corresponding voltage and current. For example, when the battery is charged up, the system does not need much charging power, and the ideal voltage may be lower; when the toothbrush is moved further away, the system needs higher charging power, and the ideal voltage may be higher. The current or voltage values detected by the sensing circuit can be approximated or rounded up to multiples of 10, 100, or the like for easy check-up.

TABLE 2

| $\Delta V$ (mV) | Input Voltage (mV) | | | | |
|---|---|---|---|---|---|
| | 5000 | 5100 | ... | 7900 | 8000 |
| Input Current (mA) | 100 | 800 | 790 | ... | 510 | 500 |
| | 120 | 750 | 740 | ... | 460 | 450 |
| | ... | ... | ... | ... | ... | ... |
| | 980 | −650 | | ... | −940 | −950 |
| | 1000 | −700 | | ... | −990 | −1000 |

By step 404, the processor 4161 may determine a stored $\Delta V$ value corresponding to the detected current voltage and current.

At step 405, the processor 4161 may determine if the power transfer efficiency is maximized. If the determined $\Delta V$ value is 0, the processor 4161 may determine that the power transfer efficiency is maximized and may record the current voltage and current in the memory 4162 at step 406.

If the determined $\Delta V$ value is not 0, the processor 4161 may determine that the power transfer efficiency is not maximized and may tune the input voltage based on the determined $\Delta V$ value at step 407. The processor 4161 may adjust the output voltage level of boost converter 414 and/or switch the working state of the gate driver 422 to achieve the tuning. Referring to Table 2, for example, if the detected input voltage is 7900 mV and the detected input current is 980 mA, the processor 4161 may determine the $\Delta V$ to be −940 mV, which means that the current voltage is 940 mV above the ideal voltage. Accordingly, the processor 4161 may control the boost converter 414 and/or the power amplifier 420 to lower the input voltage by 940 mV.

After each of the step 406 and the step 407, the method 400 may proceed to the step 403 to begin a next detection.

There can be a number of situations where the input current and/or voltage need to be adjusted. In one example during a charging process, a battery may starts from having no power to being fully charged. So towards the end of the charging process, the battery may not need as much charging power as before. In another example, a wireless toothbrush lying on a charging station described above may be accidentally moved, causing a change in the relative position between the RX coil and the TX coil. Thus, the charging efficiency may be changed, and the input current and/or voltage may need to be adjusted to compensate for the change. If the original power transfer efficiency was maximized, the voltage and current can be adjusted according to the disclosed methods and systems to bring the power transfer efficiency to the maximum.

In some situations, the mutual inductance between the TX and RX coils may decrease when the coil size difference is large or two coils are not closely coupled with each other (e.g., if being moved), and the wireless charging efficiency can be adversely affected. This could be a reason why traditional wirelessly charging toothbrushes are usually disposed on a matching base in a fixed position to ensure the maximum coil coupling. In comparison, with the voltage-adjusting systems and methods disclosed herein, the wireless charging system 200 can maintain good charging efficiency even when the mutual inductance decreases. In addition, the wireless charging system 200 can provide a large universal wireless charging area for electrical toothbrush and allow free positioning with tilted angles. For example, the charging distance between the TX coil and the RX coil may be between 1 cm and 10 cm, and the tilted angle may be from 0 to 30 degrees.

Figure 5:
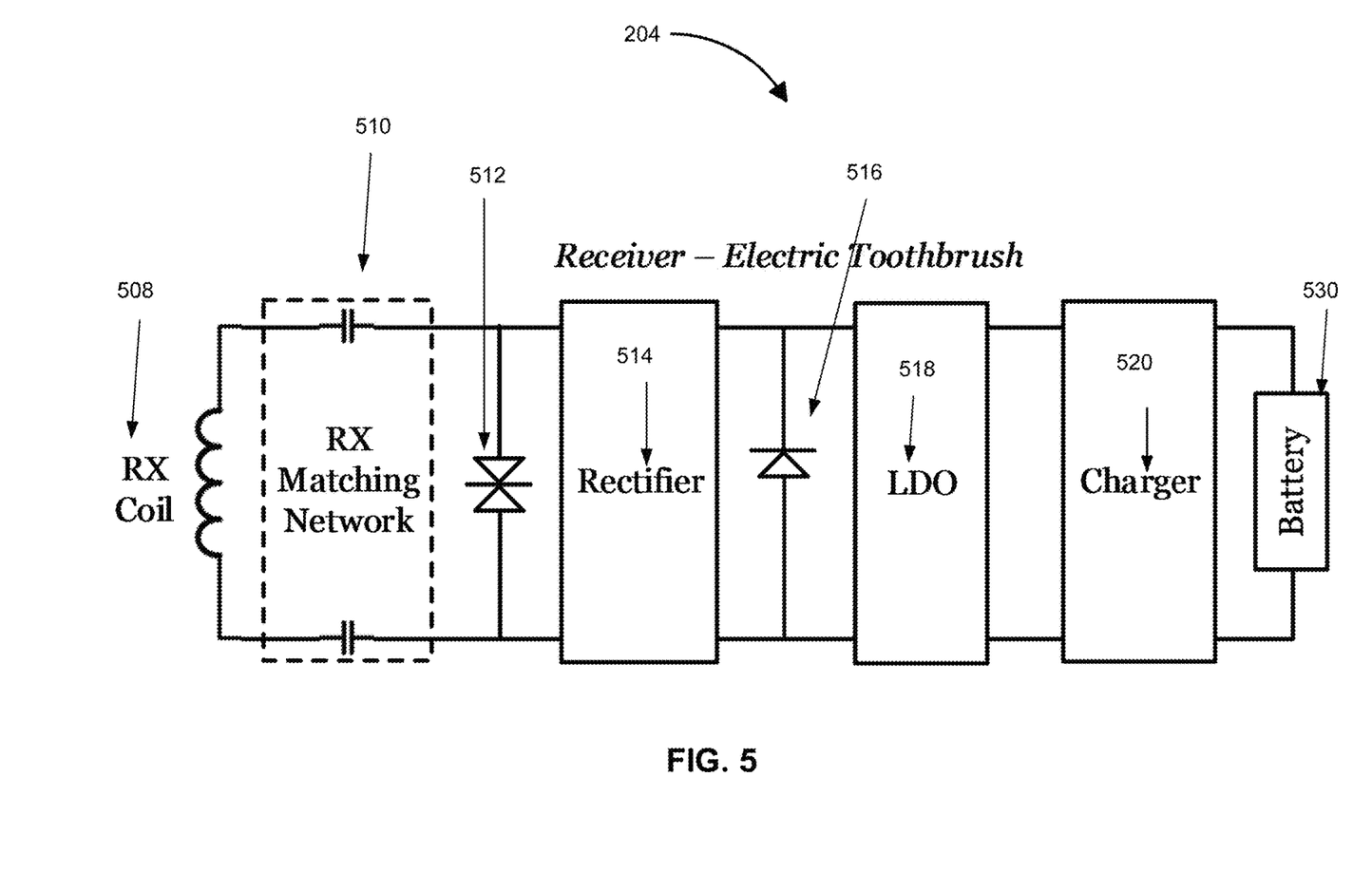
FIG. 5 is a diagram of a wireless charging receiver, consistent with exemplary embodiments of the present disclosure.

FIG. 5 shows the receiver side 204 of the wireless charging system 200, consistent with exemplary embodiments of the present disclosure. The receiver side 204 includes a receiver matching network 510, a rectifier 514, a low dropout regulator 518, a charger 520 and a battery 530. In certain embodiments, the receiver side includes a back to back transient-voltage-suppression diodes 512 before the rectifier 512 and a Zener diode 516 after the rectifier to protect the system from transient high voltages.

On the receiver side 204, similar to the transmitter side 202, the inductor 508 is connected to the RX matching network 510, which has one or more capacitors. One or more of the capacitors may have adjustable capacitance. The capacitors are used to adjust the frequency of an LC circuit formed by the inductor 508 and RX matching network 510. The inductor 508 can also be referred to as a RX coil or a receiver coil. The RX matching network 510 and the inductor 508 form a receiver resonant circuit. The RX matching network 510 is connected to the rectifier 514, which is connected to a low drop out regulator 518. The energy is received by the inductor 508 and transmitted to the rectifier 514, which converts the alternating current (AC) to direct current (DC). The low dropout regulator 518 regulates and outputs the voltage to the charger 520 that outputs the voltage to the battery 530 for charging. As described above, there is no feedback circuit at power receiver side nor intercommunication between transmitter and receiver (that is, no feedback or communication from any power receiver unit of the one or more electric devices is needed), so the system cost and complexity can be reduced.

Open-loop tuning methods and systems are disclosed for efficiency optimization in electric toothbrush wireless charging systems. The disclosed methods and systems can detect and tune input power for the best charging efficiency based on real-time monitored system parameters such as input voltages and currents. In addition, this open-loop tuning method can be cost-effective and easy to implement.

Another aspect of the disclosure is directed to a non-transitory computer-readable storage medium storing instructions which, when executed, cause one or more processors to perform the method, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage unit or the memory module having the computer instructions stored thereon, as disclosed. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for wireless electrical charging. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A wireless transmitter apparatus for charging one or more electric devices, the wireless transmitter apparatus comprising:
   a resonant circuit configured to wirelessly couple to a wireless power receiving device;
   a boost converter configured to convert a system voltage received by the apparatus to an input voltage of a power amplifier that drives the resonant circuit;
   a sensing circuit configured to detect the input voltage of the power amplifier and an input current of the power amplifier; and
   a controller configured to:
      compare the sensed input voltage of the power amplifier and the sensed input current of the power amplifier with stored voltage values and stored current values of voltage and current information, the voltage and current information defining predetermined amounts of changes in the input voltage of the power amplifier for the stored voltage values and the stored current values;
      identify a predetermined change amount for the input voltage of the power amplifier based on the comparison of the sensed input voltage of the power amplifier and the sensed input current of the power amplifier with the stored voltage values and the stored current values of the voltage and current information; and
      control the boost converter to adjust the input voltage of the power amplifier by the predetermined change amount without any feedback or communication from the wireless power receiving device.

2. The wireless transmitter apparatus of claim 1, further comprising a gate driver configured to control a current to the resonant circuit, wherein:
   the sensing circuit is further configured to detect whether the wireless power receiving device is present; and
   the controller is further configured to:
      turn on or off the gate driver based on whether the wireless power receiving device is present; and
      control the gate driver to adjust the input voltage of the power amplifier by the predetermined change amount.

3. The wireless transmitter apparatus of claim 1, further comprising a memory configured to store the voltage and current information.

4. The wireless transmitter apparatus of claim 1, wherein the voltage and current information is stored in a memory outside the wireless transmitter apparatus.

5. The wireless transmitter apparatus of claim 1, wherein the controller is configured to continuously compare the sensed input voltage of the power amplifier and the sensed input current of the power amplifier with the stored voltage values and the stored current values of the voltage and current information in real time to adjust the input voltage of the power amplifier.

6. The wireless transmitter apparatus of claim 1, wherein the resonant circuit has a resonant frequency above 1 MHz.

7. The wireless transmitter apparatus of claim 1, wherein the resonant circuit is configured to inductively couple to another resonant circuit of the wireless power receiving device.

8. The wireless transmitter apparatus of claim 7, wherein the resonant circuit is configured to wirelessly charge a battery connected to the another resonant circuit.

9. The wireless transmitter apparatus of claim 1, wherein the adjustment of the input voltage of the power amplifier by the predetermined change amount maximizes a wireless power transfer efficiency between the wireless transmitter apparatus and the wireless power receiving device.

10. The wireless transmitter apparatus of claim 9, wherein the adjustment of the input voltage of the power amplifier by the predetermined change amount maximizes a wireless power transfer efficiency between the resonant circuit and another resonant circuit of the wireless power receiving device.

11. A method implemented by a wireless transmitter apparatus for charging one or more electric devices, the method comprising:
converting a system voltage received by the wireless transmitter apparatus to an input voltage of a power amplifier that drives a resonant circuit of the wireless transmitter apparatus, wherein the resonant circuit wirelessly couples to a wireless power receiving device;
detecting the input voltage of the power amplifier and an input current of the power amplifier;
comparing the detected input voltage of the power amplifier and the detected input current of the power amplifier with stored voltage values and stored current values of voltage and current information, the voltage and current information defining predetermined amounts of changes in the input voltage of the power amplifier for the stored voltage values and the stored current values;
identifying a predetermined change amount for the input voltage of the power amplifier based on the comparison of the detected input voltage of the power amplifier and the detected input current of the power amplifier with the stored voltage values and the stored current values of the voltage and current information; and
controlling a boost converter to adjust the input voltage of the power amplifier by the predetermined change amount without any feedback or communication from the wireless power receiving device.

12. The method of claim 11, further comprising:
detecting whether the wireless power receiving device is present;
turning on or off a gate driver based on whether the wireless power receiving device is present, wherein the gate driver controls a current to the resonant circuit; and
controlling the gate driver to adjust the input voltage of the power amplifier by the predetermined change amount.

13. The method of claim 11, wherein the voltage and current information is stored in a memory of the wireless transmitter apparatus.

14. The method of claim 11, wherein the voltage and current information is stored in a memory outside the wireless transmitter apparatus.

15. The method of claim 11, further comprising continuously comparing the detected input voltage of the power amplifier and the detected input current of the power amplifier with the stored voltage values and the stored current values of the voltage and current information in real time to adjust the input voltage of the power amplifier.

16. The method of claim 11, wherein the resonant circuit has a resonant frequency above 1 MHz.

17. The method of claim 11, wherein the resonant circuit inductively couples to another resonant circuit of the wireless power receiving device.

18. The method of claim 17, wherein the resonant circuit wirelessly charges a battery connected to the another resonant circuit.

19. The method of claim 11, wherein the adjustment of the input voltage of the power amplifier by the predetermined change amount maximizes a wireless power transfer efficiency between the wireless transmitter apparatus and the wireless power receiving device.

20. A system for charging one or more electric devices, the system comprising:
a processor configured to:
compare an input voltage of a power amplifier and an input current of a power amplifier with stored voltage values and stored current values of voltage and current information, the voltage and current information defining predetermined amounts of changes in the input voltage of the power amplifier for the stored voltage values and the stored current values;
identify a predetermined change amount for the input voltage of the power amplifier based on the comparison of the input voltage of the power amplifier and the input current of the power amplifier with the stored voltage values and the stored current values of the voltage and current information; and
control at least one of a boost converter or a gate driver to adjust the input voltage of the power amplifier by the predetermined change amount without any feedback or communication from a wireless power receiving device.

* * * * *